United States Patent [19]
Martin et al.

[11] 3,860,288
[45] Jan. 14, 1975

[54] DUMP TRUCK TAILGATE ACTUATOR

[75] Inventors: Leon Z. Martin, Ephrata; Benjamin Z. Weaver, New Holland, both of Pa.

[73] Assignee: Burkholder Paving, Inc., Ephrata, Pa.

[22] Filed: Apr. 11, 1973

[21] Appl. No.: 350,047

[52] U.S. Cl. ............... 298/23 MD, 49/280, 296/56
[51] Int. Cl. ............................................. B60p 1/26
[58] Field of Search .......... 298/23 R, 23 M, 23 MD, 298/23 S, 23 A, 38; 296/50, 51, 52, 53, 55, 56, 60; 49/300, 103, 199, 280; 292/196, 195; 91/44; 214/503, 508

[56] References Cited
UNITED STATES PATENTS

| | | | |
|---|---|---|---|
| 2,208,691 | 7/1940 | Voth | 298/38 |
| 3,272,552 | 9/1966 | Park | 298/23 MD |
| 3,424,498 | 1/1969 | Maxon | 298/23 MD X |
| 3,440,763 | 4/1969 | O'Brien | 49/280 |
| 3,721,469 | 3/1973 | Senesac et al. | 298/23 MD |
| 3,811,729 | 5/1974 | Vornberger | 298/23 M |

*Primary Examiner*—Lloyd L. King
*Assistant Examiner*—Randolph A. Reese

[57] ABSTRACT

A dump truck body having a tailgate connected to the sides of said body by arms extending perpendicularly from the plane of the tailgate, the ends of said arms being pivoted to the upper edges of the sides of the body at a substantial distance from the rear ends of the sides, whereby when the arms are pivotally moved the tailgate is raised thereby to open position in which it is entirely spaced and free from the rear end of the body. Fluid-operated power units each comprising a cylinder and piston are connected between the arms and pivoted latches which secure the tailgate closed, whereby when the power units are extended, the latches are raised from latching engagement with the tailgate and said tailgate simultaneously is raised.

4 Claims, 6 Drawing Figures

PATENTED JAN 14 1975 3,860,288

DUMP TRUCK TAILGATE ACTUATOR

BACKGROUND OF THE INVENTION

For many years, dump trucks have been provided with tailgates which have been pivotally connected to the rear end of the truck body, either at a level adjacent the bed of the body, or adjacent the upper ends of the sides of the body. Suitable latches also are included to secure the tailgate in closed condition. One of the very popular types of tailgate arrangement is to have the tailgate pivoted adjacent the upper edge of the rear ends of the sides of the body and provide latches adjacent the lower edges of the side of the body for engagement with latching lugs projecting from opposite side edges of the lower edge of the tailgate. Such latches in many structures have been manually operated so that when the body of the dump truck is elevated at its forward end to effect discharge of material from the body, the latches are operated to release the tailgate and thereby permit gravity to cause the tailgate to swing to open position, various degrees of opening of the tailgate being effected by the discharge of material therethrough such as sand, stone, and other types of material normally hauled by dump trucks. Fluid-operated cylinders also have been provided heretofore for purposes of operating latches of the type described above.

It has been found that when tailgates which are pivotally connected at their upper ends to the sides of a truck body are unlatched as referred to above and the body is elevated at the forward end to effect discharge of material, damage is frequently sustained by the tailgate, especially when heavy objects such as large rocks comprise at least part of the load. When such items slide down the bed of the truck by gravity and hit the freely suspended tailgate, they contact it with great force and cause denting and bending of the tailgate in many situations. Further, the operator of the truck has no control over the degree of opening of the tailgate under such circumstances since the angle of incline of the body and gravity are the only factors which determine the position of the lower edge of the tailgate relative to the rear edge of the bed of the truck.

The lack of control of the degree of opening of pivoted tailgates of the type referred to above also renders the truck incapable of certain types of discharge such as, for example, when it is desired to discharge aggregate of various sizes, such as in paving operations, to a relatively uniform depth along a surface to be paved while the truck moves over that surface at a predetermined speed. If it were possible to space the lower edge of the tailgate from the rear edge of the bed of the truck a predetermined distance adequate to discharge a layer of aggregate of desired depth, certain types of spreading and leveling operations could be obviated in such paving activties. This is but one example of a number of different situations in which it is desirable to control the size of the space between the lower edge of a tailgate and the rear edge of the bed of a truck body when the tailgate is pivotally connected to the body at the upper corners of a tailgate, for example.

Examples of conventional tailgates and operating means therefor which have the deficiencies referred to above are shown in certain prior U.S. Pat. such as; No. 2,239,029, to Barrett, dated Apr. 22, 1941; No. 645,522, to Kersey, dated July 14, 1953; and No. 3,272,552, to Park, dated Sept. 16, 1966.

All of the patents referred to above pivotally connect the upper corners of the tailgate to the rear portion of the upper edges of the sides of the body, whereby it is only possible simply to pivotally move the tailgate relative to the upper edge thereof, not withstanding the fact that movement of the tailgate and or the latches therefor is effected by fluid-operated cylinder units in the Barrett and Park patents, while in the Kersey structure, fluid-operated means control only the latches for the lower edge of the tailgate.

As indicated above, especially when unloading heavy and large bulky type of objects such as large stones and the like, it is found to be highly desirable to displace the tailgate from the rear end of the truck body to a greater extent than is possible by simply pivotally connecting the upper corners of the tailgate to adjacent upper rear corners of the sides of the body of the truck. In addition, although the patent to Park shows structure in which a fluid-operated cylinder unit actuates both the tailgate to pivotally move the same and also latches which engage the lower edge of the tailgate, the mechanism is relatively complex. Accordingly, it is the principle purpose of the present invention to obviate the shortcomings and difficulties inherent to the structures of the such prior patents and other similar arrangements, details of said improvements being setforth below.

SUMMARY OF THE INVENTION

It is the principle of the present invention to attach a tailgate to the rear ends of the sides of a body of a dump truck by means of arms which extend substanially perpendicularly to the plane of the tailgate from the upper corners thereof, toward the front end of the body when the tailgate is in closed position, the forward ends of said arms being pivotally connected to the upper edges of the sides of the body of the truck, whereby when the tailgate is elevated, the entire tailgate will be displaced a substantial distance from the rear end of the body, particularly when the tailgate is moved to fully opened position as controlled and effected by fluid-operated cylinder units disposed at opposite sides of the body and interconnected to said arms intermediately of the ends thereof, whereby the tailgate is displaced from appreciable contact by discharging material under conditions where the body is elevated at its forward end in conventional manner on dump trucks.

It is another object of the invention to utilize the aforementioned fluid-operated cylinder units to operate latches pivotally mounted at opposite sides of the truck body adjacent the lower edges thereof, the opposite ends of the cylinder units respectively being directly connected to one end of the pivoted latches and said aforementioned arms on the tailgate, whereby the cylinder units float between said latches and arms with the exception of stop means being engaged by the latches after they have been elevated a predetermined distance to unlatched position.

It is still another object of the invention to enclose the fluid-operated cylinder units by appropriate means affixed to the outer surfaces of the opposite sides of the body of the truck to protect the same.

Details of the foregoing objects and of the invention, as well as other objects thereof, are setforth in the following specification and illustrated in the drawings comprising apart thereof.

DETAILED DESCRIPTION

Figure 1:
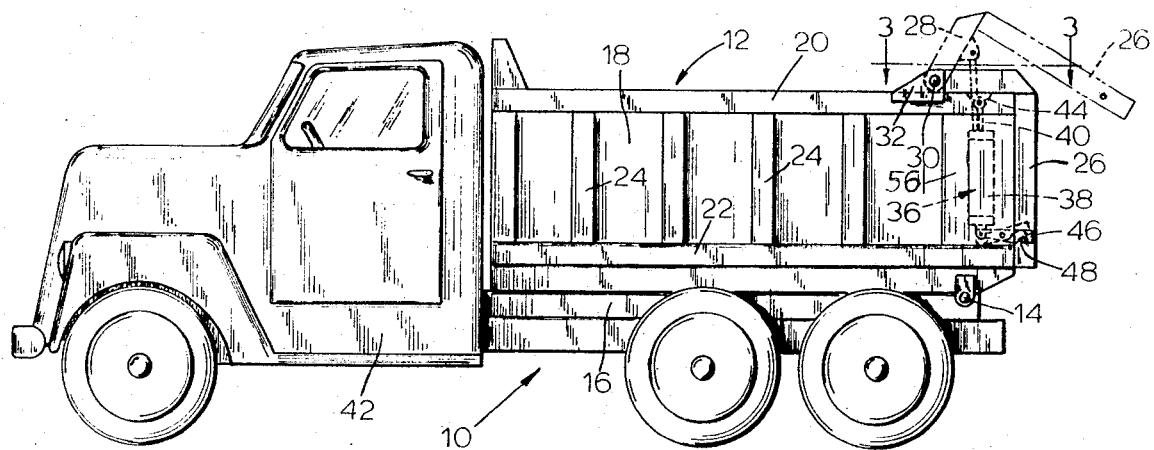
FIG. 1 is a side elevation of an exemplary dump truck having a body thereon and a tailgate mounted and operated in accordance with the principles of the present invention, the tailgate being shown in closed position in full lines, and, in phantom, the tailgate being shown in fully opened position.

Referring to FIG. 1, the truck 10 shown therein is of conventional type and includes a body 12 which is pivotally connected at 14 to the chassis 16, in conventional manner. Also, not shown, is a power unit of conventional type by which the forward end of the body 12 is elevated to dispose the same in sloping, discharging position as fragmentarily shown in FIGS. 2 and 5. The body 12 comprises sides 18 which are formed from sheet steel and elongated, reinforcing sections 20 and 22, which are either square or rectangular in cross-section, respectively, extend along the upper and lower edges of the sides 18 of the body 12. Perpendicular similar sections 24 also extend between the reinforcing sections 20 and 22, in conventional manner.

The tailgate 26 is also formed from sheet steel and the edges are surrounded by conventional reinforcing sections which are also either square or rectangular in cross-section, similar to the sections 20, 22 and 24, for example. Rather than pivotally connecting the upper edge of the tailgate 26 directly to the upper, rearward corners of the sides 18 for example, as in conventional dump truck constructions, the present invention includes mounting arms 28 which respectively are connected at one end to the upper outer corners of the tailgate 26. The mounting arms are fixed to the tailgate by any suitable means such as welding or otherwise. Said arms are also perpendicular to the plane of the tailgate 26 and extend toward the forward end of the body 18 a substantial distance, as is clearly shown in FIGS. 1 and 4 in particular.

Figure 2:
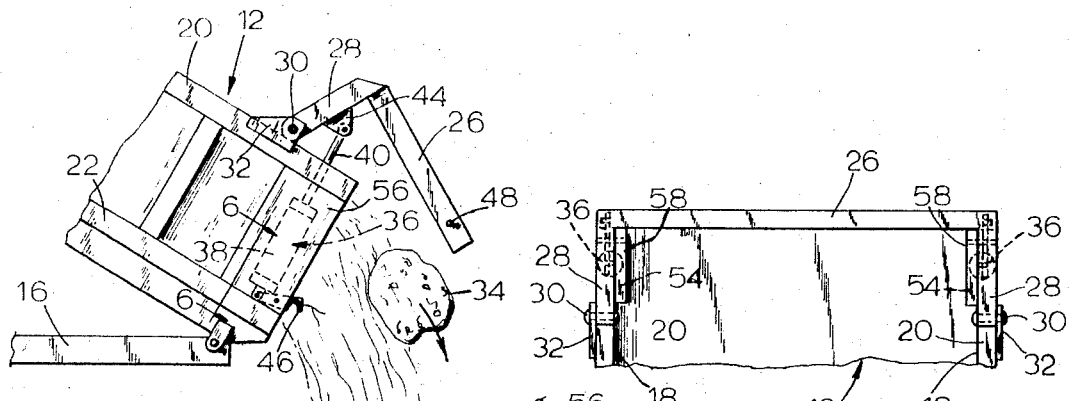
FIG. 2 is a fragmentary side elevation of the truck shown in FIG. 1 illustrating the rear end thereof in elevated, discharging position and the tailgate being shown in fully opened position.
Figure 5:
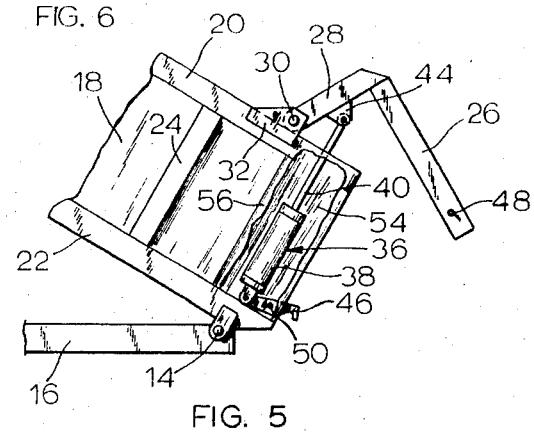
FIG. 5 is a view similar to FIG. 2 but showing the enclosure for the power unit broken away to illustrate details thereof.

Preferably, the arms 28 have a length which is at least equal to half the height of the tailgate 26. The forward ends of the arms 28 are pivotally connected by pins 30 to cleats 32 which are suitably connected to the upper reinforcing sections 20 of the opposite sides 18 of the body 12 by any suitable means such as weldments, riveting, or otherwise. As is best shown in FIGS. 1, 2, and 5, by utilizing the mounting arms 28 in the manner shown, and particularly in view of the substantial length thereof, it will be seen that when the tailgate is raised to substantially fully open position such as shown in FIG. 2, the tailgate will be appreciably removed and thereby spaced from the rear end of the truck body and thus offer no resistance to material being discharged from the rear end of said body. From FIG. 2, it also can be appreciated that such freedom from obstruction prevents any substantial possibility of injuring the tailgate incident to discharge of even heavy, bulky items such as large rocks and the like.

The tailgate 26 is moved between closed and opened positions respectively shown in full lines and in phantom in FIG. 1 by power units 36, respectively, mounted at opposite sides of the body 12 adjacent the rear ends thereof. The power units each comprise a cylinder 38 and a piston having a piston rod 40 projecting therefrom. The power units 36 preferably are operated by hydraulic fluid supplied to opposite ends of the cylinders 38 by suitable conduits, not shown, but of a conventional nature. Supply of fluid to the cylinders 38 also is controlled by a conventional valve, not shown, which normally in readily accesible within the cab 42 of the truck. The outer end of the piston rod 40 of each of the power units, respectively, are connected to clevises 44 which are fixedly mounted upon the under surfaces of the arms 28 on the tailgate 26. Preferably, the clevises 44 are disposed substantially midway between the opposite ends of the arms 28.

Figure 4:
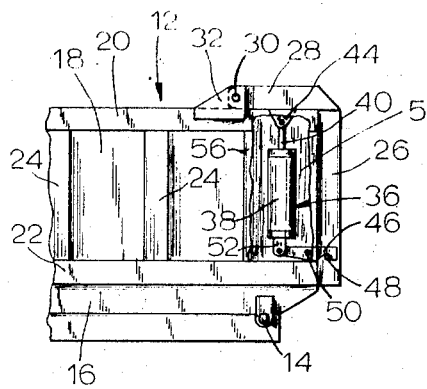
FIG. 4 is a fragmentary side elevation of the rear end of the truck illustrating the gate in closed and latched position and part of the enclosure for the power unit being broken away to illustrate details thereof.

Tailgate 26 is maintained in the closed position thereof shown in FIGS. 1 and 4 by means of pivoted latches 46, the outer ends of which have notches to engage latching lugs 48 which respectively project from opposite side edges of the tailgate 26 adjacent the lower edge thereof as best shown in FIGS. 2 and 5. The latches 46 are pivoted midway of their length to the opposite sides 18 of the truck body 12 by appropriate pins 50 which are supported fixedly in any suitable manner with respect to the lower reinforcing sections 22 at opposite sides of the body 12, for example. The end of the cylinder 38 of each of the power units 36 which is opposite that from which the piston rod 40 projects is provided with a clevis 52 that is pivotally connected to the inner ends of the latches 46 which are opposite the notched ends thereof that engage the latching lugs 48. An appropriate pin extends through each of the clevises 52 and the ends of the latches 46 to which they are connected. Thus, it will be seen that the power units 36 are floating in their position between the clevises 44 on the arms 28 and the latches 46.

Figure 3:
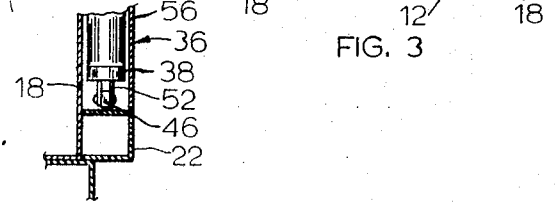
FIG. 3 is a fragmentary plan view showing a portion of the mounting mechanism for the tailgate, as seen on the line 3—3 of FIG. 1.

The power units preferably are enclosed within suitable compartments 54 formed from sheet metal which are rectangular in cross section, the outer sides 56 of said compartments either being spaced outwardly from the sides 18 of the truck body 12 a sufficient distance to readily accommodate the diameters of the cylinders 38 or, as shown in FIG. 3, as an exemplary alternative, suitable housing members 58 may extend inwardly a slight distance beyond the sides 18 of truck body 12.

Figure 6:
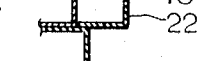
FIG. 6 is a fragmentary vertical section view showing details of one of the power units and latch mechanism operated thereby as seen on the line 6—6 of FIG. 2.

In operation, as best shown in FIGS. 2 and 5, for example, and also somewhat in FIG. 6, when the power units 36 are extended from the position occupied when the tailgate 26 is in closed position and secured therein by the latches 46, the initial movement of the power units 36 will be to project the lower end of the cylinders 38 downwardly and thus release the latches 46 from the latching lugs 48 on the tailgate. This, as shown in FIG. 6 in particular, will dispose the inner end of the latches 46 against the upper surface for example of the reinforcing section 22 on the truck body, thereby restricting any further downward movement of said end of the latch. Continued expansion of the power units then results in the connecting rods 40 simultaneously operating to raise the tailgate to the full extent of the travel permitted by the power units 36 and thus move the tailgate 26 to the fullest opened position thereof which, for example, is shown in FIGS. 2 and 5.

When the tailgate is in the exemplary fully opened position thereof as illustrated in FIGS. 2 and 5, as indicated above, the tailgate 26 will be very substantially displaced from contact of any kind with the rear end of the truck body 12, as can best be appreciated from FIG. 2 in which a large object such as a heavy stone 34 is shown in exemplary manner in process of beind discharged from the opened rear end of the body 12, as when the forward end of the body has been elevated a desired distance. Thus, the material is free to discharge from the slanting bed of the truck body 12 without contacting the tailgate 26 in any way and thereby preventing any substantial damage thereto even when discharging large rocks or other similar objects from the body of the truck.

Under such circumstances, it will be seen that the floating type of mount for the power units 36 is extremely simple, yet highly effective to initially disengage the latches from the tailgate, and to raise the tailgate to fully opened position. The enclosed compartments 54 afford adequate protection to the power unit to prevent damage thereto. Further, at the completion of an unloading operation, the body 12 is restored to its normal horizontal position such as shown in FIG. 1 and the power units 36 then are operated to lower the tailgate to the closed position thereof shown in FIGS. 1 and 4, for example. Due to the weight of the tailgate, such lowering will restore the tailgate to closed position before any operation of the latches occurs to secure the tailgate latched in closed position.

The power units 36 also may be used to maintain the tailgate only partially open to effect discharge of a bed of material of substantially uniform thickness.

While the invention has been described and illustrated in its several preferred embodiments, it should be understood that the invention is not to be limited to the precise details herein illustrated and described since the same may be carried out in other ways falling within the scope of the invention as illustrated and described.

We claim:

1. A dump truck body having similar sides extending perpendicularly upward from opposite side edges of the bed of the body and the rear end of said body being open, in combination with a tailgate and operating and latching mechanism therefor, said tailgate having arms connected at one end to and extending substantially perpendicularly from the tailgate at the opposite upper courses thereof, means pivotally connecting the opposite ends of said arms respectively to the upper edges of the opposite sides of said body at locations spaced from the rear ends of said sides a substantial distance, a pair of fluid-actuated cylinder and piston power units mounted adjacent the opposite sides of said body and pivotally connected to said arms on said tailgate in spaced relation to the pivoted ends thereof and operable to elevate said tailgate to open position from closed position by moving said arms upwardly from the pivoted ends thereof and thereby moving said tailgate outward from said rear end of said body and upwardly to dispose said tailgate entirely disengaged and spaced from the rear ends of the sides of said body and thereby render the rear end of said body free from obstruction by said tailgate when the latter is in said open position thereof, latch levers respectively pivotally connected intermediately of the ends thereof to the sides of said body adjacent the lower edges and outer ends thereof, the outer ends of said latch levers comprising latching ends extending beyond the outer ends of said sides of said body and engageable with latching lugs extending from opposite side edges of said tailgate, and one end of each of said power units being connected respectively to the opposite ends of said latch levers, whereby when said power units are energized the piston rods extend from said cylinders to elongate said units and simultaneously depress the ends of said latch levers to which they are connected and raise the outer latching ends thereof to release the same from said latching lugs on said tailgate and thereupon raise said tailgate by pivotal movement of said arms thereon, said power units thereby floating between said latch levers and arms.

2. The dump truck according to claim 1 in which said sides of said body have reinforcing extensions along the lower edges of the sides of said body, said extensions being positioned for engagement by the inner ends of said latch levers to arrest further movement after the outer latching ends thereof have been raised from engagment with the latching lugs on said tailgate, whereupon continued elongation of said power units is applied solely to raising said tailgate to said open position thereof.

3. The dump truck according to claim 1 further including cleats extending upwardly from and connected to the upper edges of the sides of said body and said opposite ends of said arms being pivotally connected to said cleats, said arms also being parallel to the upper edges of said sides and extending along the same when said tailgate is in closed position.

4. The dump truck according to claim 1 in which said latch levers have latching notches extending upwardly into the lower edges thereof and positioned to receive said latching lugs on the ends of said tailgate when the same is in closed position.

* * * * *